United States Patent
Kippie et al.

(10) Patent No.: US 7,387,985 B2
(45) Date of Patent: Jun. 17, 2008

(54) MONOVALENT CATION-CONTAINING WELL FLUIDS

(75) Inventors: David P. Kippie, Mandeville, LA (US); Morris Arvie, Jr., Houston, TX (US)

(73) Assignee: M-I L.L.C., Houston, TX (US)

( * ) Notice: Subject to any disclaimer, the term of this patent is extended or adjusted under 35 U.S.C. 154(b) by 198 days.

(21) Appl. No.: 10/813,314

(22) Filed: Mar. 30, 2004

(65) Prior Publication Data

US 2004/0192561 A1   Sep. 30, 2004

Related U.S. Application Data

(60) Provisional application No. 60/459,128, filed on Mar. 31, 2003.

(51) Int. Cl.
*E21B 43/00* (2006.01)
(52) U.S. Cl. ............ 507/212; 507/209; 507/269; 507/276; 507/903; 166/308.2
(58) Field of Classification Search ............... 507/212
See application file for complete search history.

(56) References Cited

U.S. PATENT DOCUMENTS

| | | | | |
|---|---|---|---|---|
| 2,658,035 A | * | 11/1953 | Bode ........................ | 507/111 |
| 4,422,947 A | * | 12/1983 | Dorsey et al. ............. | 507/111 |
| 4,652,384 A | * | 3/1987 | Francis et al. ............ | 507/111 |
| 4,971,723 A | * | 11/1990 | Chiu ......................... | 516/105 |
| 5,496,861 A | * | 3/1996 | Rouse et al. .............. | 514/778 |
| 5,804,535 A | * | 9/1998 | Dobson et al. ............ | 507/111 |
| 5,851,959 A | * | 12/1998 | Bernu ....................... | 507/111 |
| 5,955,401 A | * | 9/1999 | Liao ......................... | 507/110 |
| 6,103,671 A | * | 8/2000 | Dobson et al. ............ | 507/261 |
| 6,133,203 A | * | 10/2000 | Estes et al. ............... | 507/209 |
| 6,300,286 B1 | * | 10/2001 | Dobson et al. ............ | 507/111 |
| 6,315,061 B1 | * | 11/2001 | Boatman et al. ........... | 175/5 |
| 6,391,830 B1 | * | 5/2002 | Dobson et al. ............ | 507/111 |
| 6,420,319 B1 | * | 7/2002 | Estes et al. ............... | 507/209 |
| 6,576,597 B2 | * | 6/2003 | Dobson et al. ............ | 507/111 |
| 2003/0191029 A1 | * | 10/2003 | Dino ......................... | 507/111 |

OTHER PUBLICATIONS

Hawley's Condensed Chemical Dictionary, 13th Edition, Revised by Richard J. Lewis, 1997, p. 981.*

* cited by examiner

*Primary Examiner*—Randy Gulakowski
*Assistant Examiner*—John J Figueroa

(57) ABSTRACT

A monovalent cation containing well fluid composed of an aqueous brine containing at least 0.6 equivalents per liter of a water soluble monovalent cation salt, is substantially free of divalent cations, and an amount of a starch derivative selected such that the well fluid has the following characteristics: (a) a low shear rate viscosity greater than about 5,000 centipoise; (b) a high shear rate viscosity at 511 $\sec^{-1}$ in the range from about 15 to about 70 centipoise measured at 120° F. is described. The fluid may be formulated to be substantially free of xanthan gums and preferably has less than 0.25 lb/bbl of xanthan gum.

17 Claims, No Drawings

MONOVALENT CATION-CONTAINING WELL FLUIDS

This application claims the benefit of U.S. Provisional Application No. 60/459,128, filed Mar. 31, 2003 the contents of which are incorporated herein by reference.

BACKGROUND OF THE INVENTION

When drilling or completing wells in earth formations, various fluids typically are used in the well for a variety of reasons. The fluid often is aqueous. For the purposes herein, such fluid will be referred to as "well fluid." Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, implacing a packer fluid, abandoning the well or preparing the well for abandonment, and otherwise treating the well or the formation. Brines (such as $CaBr_2$) commonly are used as well fluids because of their wide density range and the fact that brines are typically substantially free of suspended solids. Additionally, brines typically do not damage certain types of downhole formations.

When drilling progresses to the level of penetrating a hydrocarbon bearing formation, special care may be required to maintain the stability of the wellbore. Examples of formations in which problems often arise are highly permeable and/or poorly consolidated formations. In these types of formations, a technique known as "under-reaming" may be employed.

In this process, the wellbore is drilled to penetrate the hydrocarbon bearing zone using conventional techniques. A casing generally is set in the wellbore to a point just above the hydrocarbon bearing zone. The hydrocarbon bearing zone then may be re-drilled, for example, using an expandable under-reamer that increases the diameter of the wellbore. Under-reaming usually is performed using special "clean" drilling fluids. Typical drilling fluids used in under-reaming are expensive, aqueous, dense brines that are viscosified with a gelling and/or cross-linked polymer to aid in the removal of formation cuttings. The high permeability of the target formation, however, may allow large quantities of the drilling fluid to be lost into the formation.

Once the drilling fluid is lost into the formation, it becomes difficult to remove. Calcium and zinc-bromide brines can form highly stable, acid insoluble compounds when reacted with the formation or substances contained therein. This reaction may reduce the permeability of the formation to any subsequent out-flow of the targeted hydrocarbons. The most effective way to prevent such damage to the formation is to limit fluid loss into the formation.

Thus, providing effective fluid loss control is highly desirable to prevent damaging the formation in, for example, completion, drilling, drill-in, displacement, hydraulic fracturing, work-over, packer fluid implacement or maintenance, well treating, or testing operations. Techniques that have been developed to control fluid loss include the use of fluid loss "pills." Significant research has been directed to determining suitable materials for the fluid loss pills, as well as controlling and improving the properties of the fluid loss pills. Typically, fluid loss pills work by enhancing filter-cake buildup on the face of the formation to inhibit fluid flow into the formation from the wellbore.

U.S. Pat. No. 6,300,286 (the '286 patent) and the related U.S. Pat. No. 6,576,597 (the '597 patent) describe clay-free well drilling and servicing fluids comprising an aqueous brine which contains at least 0.6 equivalents per liter (the '286 patent) or at least 1.2 equivalents per liter (the '597 patent) of a water soluble divalent cation salt, a particulate bridging agent which is insoluble in the aqueous brine, and a starch derivative which functions as a combination suspending agent and fluid loss control agent. The starch derivative is used in a concentration sufficient to provide the fluid with the following characteristics: (a) a low shear rate viscosity less than about 10,000 centipoise; (b) a high shear rate viscosity at 511 $sec^{-1}$ in the range from about 15 to about 70 centipoise measured at 120° F.; (c) a fluid loss less than about 10 milliliters as measured at 185° F. and 250 psi differential pressure across a 5 micron disk for 30 minutes; and (d) anti-settling characteristics as exhibited upon static aging the fluid for 16 hours at 185° F. The patents further provides that the low shear rate viscosity can be increased without raising the high shear rate viscosity above about 70 centipoise by incorporating magnesium oxide and/or dipotassium hydrogen phosphate in the fluids.

The '286 patent further discloses that useful brines in the compositions and processes of the '286 patent contain at least 0.6 equivalents per liter of one or more water soluble divalent cation salts. Similarly the '597 patent discloses that useful brines in the compositions and processes of the '597 patent contain at least 1.2 equivalents per liter of one or more water soluble divalent cation salts. Preferred divalent cations are the alkaline earth metal salts and/or zinc salts. The preferred anion is a halide, most preferably chloride and/or bromide. Most preferred divalent cations are selected from the group consisting of calcium, magnesium, zinc, and mixtures thereof. The most preferred salts are selected from the group consisting of calcium chloride, calcium bromide, magnesium chloride, magnesium bromide, zinc chloride, zinc bromide and mixtures thereof. Further, the '286 patent notes that other water soluble salts must be present in the brine at a concentration no less than 0.6 equivalents per liter. Further the '597 patent specifically teaches that other water soluble salts may be present in the brine so long as they do not dilute the divalent cation concentration below about 1.2 equivalents per liter. Thus one of skill in the art would appreciate that a divalent cation is a required element in the inventions disclosed in the above references.

Because of a number of factors including environmental factors, compatibility factors, costs, etc. . . . , the use of divalent cations as disclosed above is not desireable. Thus, what is still needed are fluids which exhibit enhanced particulate suspension characteristics at lower viscosities and which are easier and more completely removed from wellbores, screens, and the like present in hydrocarbon-containing formations.

SUMMARY

In one aspect, the claimed subject matter is generally directed to a monovalent cation containing well fluid that includes: an aqueous brine containing at least 0.6 equivalents per liter of a water soluble monovalent cation salt and which is substantially free of divalent cation salt; and an amount of a starch derivative selected such that the well fluid has the following characteristics: (a) a low shear rate viscosity greater than about 5,000 centipoise; (b) a high shear rate viscosity at 511 sec$^{-1}$ in the range from about 15 to about 70 centipoise measured at 120° F. The starch derivative is preferably a pre-gelatinized crosslinked amylopectin starch which has been crosslinked to the extent that the viscosity of a basic aqueous amylopectin starch suspension undergoing crosslinking is within about 25% to less than about 50% of the maximum viscosity which can be obtained.

In another illustrated aspect of the claimed subject matter, includes a monovalent cation containing well fluid comprising: an aqueous brine containing at least 0.6 equivalents per liter of a water soluble monovalent cation salt and less than 0.6 equivalents per liter of a water soluble divalent cation salt; and a viscosifying agent including a starch derivative, wherein the starch derivative is a pre-gelatinized crosslinked amylopectin starch which has been crosslinked to the extent that the viscosity of a basic aqueous amylopectin starch suspension undergoing crosslinking is within about 25% to less than about 50% of the maximum viscosity which can be obtained. Preferably, the viscosifying agent is substantially free of xanthan gum that is to say the well fluid is formulated so that the well fluid contains less than 0.25 lb/bbl xanthan gum.

Other aspects and advantages of the claimed subject matter will be apparent from the following description and the appended claims.

DETAILED DESCRIPTION

The claimed subject matter relates to well fluids having selected fluid properties, which use the discovery that certain starch derivatives function in certain monovalent cation brine systems to impart desirable fluid properties. In particular, certain embodiments have improved suspension characteristics and fluid loss control characteristics. Monovalent cation brine systems are used in the present invention, because often, monovalent cation brines may be used in fields where (for environmental, formation incompatibility or other concerns) divalent cation brines may not be used.

The brines useful in the compositions and processes of the claimed subject matter contain at least 0.6 equivalents per liter of one or more water soluble monovalent cation salts. The cation may be any suitable monovalent cationic metal, preferably the monovalent cations are group I metals. More preferably, sodium or potassium are used as the monovalent cation. The anion may be any suitable conjugate base of an acid, but preferably the anion is a halide, and most preferably bromide and/or chloride. Thus, the most preferred brine is sodium bromide. The preferred brines have a density of at least about 9.5 lb/gal.

It should be noted that the brines of the present invention are formulated so as to specifically exclude the presence of divalent cations. One of skill in the art should appreciate that the total elimination of all divalent cations from the fluid is not practicable. With that being the case, the fluids of the claimed subject matter should be substantially free of divalent cations. In some instances during the course of drilling, divalent cations may be unintentionally entrained and dissolved in the fluids of the claimed subject matter. Such instances are clearly unintentional and unavoidable during the course of the drilling operation. Thus, the brines of the present invention are intentionally formulated so as to be substantially free of divalent cations. In one embodiment, the concentration of divalent cations in the formulated fluid is less than about 0.6 equivalents per liter.

Starch is a natural polymer containing an abundance of hydroxyl groups. Each anhydroglucose unit contains two secondary hydroxyls and a large majority contain primary hydroxyls. These hydroxyls potentially are able to react with any chemical capable of reacting with alcoholic hydroxyls. This would include a wide range of compounds such as acid anhydrides, organic chloro compounds, aldehydes, epoxy, ethylenic compounds, etc. When the specified chemical contains two or more moieties capable of reacting with hydroxyl groups, there is the possibility of reacting two different hydroxyls resulting in crosslinking between hydroxyls on the same molecule or on different molecules.

The chemistry of starch and the preparation of a multitude of derivatives thereof is well known. Representative crosslinking materials are epichlorohydrin and other epihalohydrins, formaldehyde, phosphorous oxychloride, trimetaphosphate, dialdehydes, vinyl sulfone, diepoxides, diisocyanates, bis(hydroxymethyl) ethylene urea, and the like. The preferred crosslinking compound is epichlorohydrin. Crosslinking of the starch results in an increase in the molecular weight of the starch and an increase in the viscosity of aqueous dispersions of the starch.

The reaction conditions used in making crosslinked starches vary widely depending upon the specific bi-or polyfunctional reagent used for the crosslinking. In general, most of the reactions are run on aqueous suspensions of starch at temperatures ranging from room temperature up to about 50° C. Often an alkali such as sodium hydroxide is used to promote reaction. The reactions are normally run under neutral to fairly alkaline conditions, but below the level which will peptize or swell the starch. If the crosslinking reaction is run in an aqueous suspension of starch, when the desired level of crosslinking (usually as measured by some type of viscosity or rheology test) is reached, the starch suspension is neutralized and the starch is filtered and washed to remove salts, any unreacted reagent, and other impurities produced by side reactions of the crosslinking reagent with water.

It is preferred that the amylopectin starch for use in the claimed subject matter be crosslinked with epichlorohydrin in a basic aqueous starch suspension at a temperature and for a period of time such that the Brabander viscosity of the suspension is within about 25% to about 60% of the maximum attainable viscosity, preferably from about 25% to less than about 50% of the maximum attainable viscosity. The viscosity will vary by the amount of crosslinking and the test conditions, i.e., temperature, concentrations, etc. A viscosity peak indicates maximum crosslinking. When the desired viscosity is reached, the crosslinking reaction is terminated. A Brabender Viscometer is a standard viscometer readily available on the open market and well known to those skilled in the art.

As indicated, the crosslinked amylopectin starch of the claimed subject matter is pre-gelatinized. The term "gelatinization" is well known in the art and is generally used to describe the swelling and hydration of starches. Starch granules are insoluble in cold water but imbibe water reversibly and swell slightly. However, in hot water, a large irreversible swelling occurs producing gelatinization. Gelatinization takes place over a discrete temperature range that depends on starch type. Because gelatinization increases the viscosity of a starch suspension, the gelatinization of the starch is preferably conducted after the amylopectin starch is crosslinked to the desired extent as indicated herein.

Certain chemicals increase the gelatinization temperature range of starches and thus such chemicals can be present during the crosslinking of the amylopectin in order that the crosslinking temperature can be increased without gelatinization of the starch occurring. The term "pre-gelatinized" indicates that the crosslinked amylopectin has been gelatinized such that the crosslinked amylopectin does not undergo gelatinization upon adding it to the brines of the present invention.

The crosslinked amylopectin is normally gelatinized by heating the crosslinked amylopectin at a temperature above the gelatinization temperature, such as during drying of the crosslinked starch slurry.

As indicated, the pre-gelatinized crosslinked amylopectin for use in the claimed subject matter is preferably derived from a waxy starch, preferably waxy corn (maize) starch. As is known, waxy starches are virtually all amylopectin whereas common starches contain both amylose and amylopectin molecules. For the purposes of disclosing and claiming this invention, the amylopectin contains less than about 10% by weight amylose, preferably not more than about 5% amylose and most preferably less than 1% amylose.

The brines may contain other compatible water soluble salts therein. The term "compatible" as used herein in regards to the claimed subject matter refers to a salt which does not result in precipitate formation in the brine and/or which does not prevent the disclosed pre-gelatinized crosslinked amylopectin starch from providing the brines with the characteristics set forth herein.

The fluids of the claimed subject matter may contain other functional additives to impart specific properties to the fluids. Thus the fluids may contain weight materials (which may function as bridging agents in an appropriate particle size range), corrosion inhibitors, anti-oxidants, oxygen scavengers, reducing agents, lubricants, supplemental fluid loss control additives, supplemental viscosifiers, and the like.

The fluids of the claimed subject matter may have a bridging agent incorporated therein. The bridging agents useful in the claimed subject matter are well known in the art. They are solid, particulate, water soluble salts or acid soluble materials the particles of which have been sized to have a particle size distribution sufficient to seal off the pores of the formations contacted by the well drilling and servicing fluid as is well known in the art. The bridging agent preferably is not appreciably soluble in the liquid used to prepare the fluid or a quantity of the bridging agent has previously been dissolved in the fluid so that the bridging agent is not further appreciably soluble in the liquid used to prepare the fluid. Other embodiments of the invention, however, are substantially "solid-free" and do not use any such bridging agent.

Representative water soluble salt bridging agents include sodium chloride, potassium chloride, magnesium chloride, potassium formate, calcium bromide, calcium chloride, magnesium oxide and the like.

Preferred bridging agents have a specific gravity less than about 2.8 and are sufficiently acid soluble such that they readily decompose upon acidizing the filter cake and deposits in the borehole. Representative bridging agents are calcium carbonate, dolomite (calcium magnesium carbonate), colemanite, ulexite, analcite, apatite, bauxite, brucite, gibsite, and hydrotalcite.

Generally the concentration of the bridging agents will be from about 5 ppb (ppb=lbm/bbl) to about 200 ppb and more, preferably from about 10 ppb to about 50 ppb.

The concentration of the starch derivative is preferably selected to be sufficient to provide the fluid with the following characteristics: (a) a low shear rate viscosity greater than about 5,000 centipoise; (b) a high shear rate viscosity at 511 $sec^{-1}$ in the range from about 15 to about 70 centipoise measured at 120° F. Generally, the concentration of the starch derivative will be from about 5 ppb to about 15 ppb, preferably from about 6 ppb to about 14 ppb, and most preferably from about 7 ppb to about 12 ppb.

A 12.0 ppg fluid (formulation 1) was prepared by mixing containing 1.0 bbl equivalents of a 12.0 ppg NaBr brine, 10 ppb of a calcium carbonate bridging agent, 1.0 ppb of magnesium oxide, 8.0 ppb of the pre-gelatinized crosslinked amylopectin. Formulations 2 and 3 were prepared in a similar fashion, but with differing amounts of chemicals. Table 1 below provides the compositions of Formulations 1-3.

TABLE 1

Formulations 1-3

| Product Name | Formulation #1 (12.0 lb/gal) | Formulation #2 (10.5 lb/gal) | Formulation #3 (10.5 lb/gal) |
| --- | --- | --- | --- |
| 10.2 lb/gal NaBr |  | 0.953 bbl |  |
| 10.3 lb/gal NaBr |  |  | 0.965 bbl |
| 12.0 lb/gal NaBr | 1.0 bbl |  |  |
| MgO | 1.0 ppb | 1.0 ppb | 2.0 ppb |
| Modified Starch | 8.0 ppb | 8.0 ppb | 12.0 ppb |
| Calcium montmorillonite (Simulated drill solids) | 30 ppb |  |  |
| CaCO$_3$ | 10 ppb | 20 ppb | 10.0 ppb |

Additionally, while a particular order of addition for the chemical components is presented herein, such a description of the order of addition of the components is not intended to limit the scope of the claimed subject matter in any fashion.

After mixing the all the components except the simulated drill solids, the Rheological parameters were measured (Initial A, in the table below) formulation 1 was allowed to stand for approximately 17 hours. The rheological measurements were made using a Fann model 35 rotational viscometer (manufactured by Fann Instrument Co., of Houston, Tex.), using a B1 bob. Specifically, the apparent viscosity was measured. Viscosity is the ratio of the shear stress to the shear rate and is an indication of flow resistance. For many fluids, apparent viscosity changes for different values of shear rate, and is measured in centipoise (cP). Shear rate is measured in RPM or $sec^{-1}$. In this embodiment, the initial apparent viscosity was measured at six different shear rates: 600 rpm, 300 rpm, 200 rpm, 100 rpm, 6 rpm, and 3 rpm.

In a second test (Initial B), formulation 1 was hot rolled for 17 hours at 130° F. prior to taking initial rheological measurements. In a third test (Initial C), formulation 1 was hot rolled for 17 hours at 130° F., but approximately 30 ppb of simulated drill solids were added to the formulation. In a fourth test (Initial D), the base fluid of formulation 1 was heated to 120° F., then product/or components were added to the base fluid and then initial rheological parameters were measured.

The results are summarized in the table below:

TABLE 2

APPARENT VISCOSITY FOR FORMULATION 1

| Shear Rate (RPM) | Initial A | Initial B Hot Rolled @ 130° F. | Initial C Added 30 ppb Simulated Drill Solids | Initial D Initial Properties - Preheating fluid |
|---|---|---|---|---|
| 600 | 28 | 42 | 50 | 47 |
| 300 | 18 | 28 | 36 | 35 |
| 200 | 14 | 20 | 30 | 30 |
| 100 | 9 | 13 | 24 | 24 |
| 6 | 2 | 3 | 10 | 10 |
| 3 | 1 | 2 | 9 | 9 |
| pH | 7.2 | 8.6 | 8.0 | 8.1 |

It is a novel feature of the claimed subject matter that the starch derivative imparts excellent suspension characteristics to the fluids at the low viscosities imparted to the fluids. It is preferred that the fluids of the claimed subject matter are substantially free of any polymeric viscosifiers, such as biopolymers, xanthan gums. That is to say the fluids of the claimed subject matter achieve the above results without the inclusion of xanthan gums and the like.

The significance of this observation is relevant to that disclosed in U.S. Pat. No. 6,133,203 in which a combination of starch and xanthan gums are used in conjunction with each other to obtain the necessary well fluid properties. As will be appreciated by one of skill in the art, the above data shows that the combination of starch and xanthan gums is always necessary to achieve the desired properties of viscosity in wellbore fluids. Thus, one preferred embodiment of the claimed subject matter is a well bore fluid that is substantially free of xanthan gums and other similar biopolymers and preferably the illustrative fluids contain less than 0.25 lb/bbl (i.e. less than 0.71 grams per liter) of xanthan gum.

In addition, initial viscosity readings of formulations 2 and 3 were measured at 120° F. The results from these measurements are presented in Tables 3 and 4 below.

TABLE 3

Initial Viscosity of Formulation 2

| Shear Rate (RPM) | Initial |
|---|---|
| 600 | 34 |
| 300 | 22 |
| 200 | 18 |
| 100 | 14 |
| 6 | 8 |
| 3 | 7 |
| pH | 9.3 |

The initial viscosity of Formulation 3 was measured in a similar fashion, but was measured without (Initial A) and with (Initial B) the $CaCO_3$.

TABLE 4

Initial Viscosity of Formulation 3

| Shear Rate (RPM) | Initial A | Initial B |
|---|---|---|
| 600 | 49 | 63 |
| 300 | 32 | 46 |
| 200 | 25 | 37 |
| 100 | 17 | 27 |
| 6 | 3 | 8 |
| 3 | 2 | 7 |
| pH | 9.6 | 9.6 |

The fluids of the claimed subject matter may be prepared and the method of the claimed subject matter practiced, by mixing the dense monovalent cation-containing brine as set forth herein with the starch derivative. Further, fluids in accordance with the claimed subject matter may also include bridging agents, or may be substantially solids-free. Additional formulations in accordance with the present invention, and initial measurements are shown below.

TABLE 5

Initial Measurements for Formulations 4-7

| Formulation | 4 | 5 | 6 | 7 |
|---|---|---|---|---|
| 12.0 lb/gal NaBr (heated to 130° F.) | 350 mL | 350 mL | 350 mL | 350 mL |
| MgO (grams) | 2 | 2 | 2 | 2 |
| Starch (grams) | 6 | 8 | 10 | 12 |
| Shear Rate (RPM) | Initial 4 | Initial 5 | Initial 6 | Initial 7 |
| 600 | 16 | 27 | 55 | 72 |
| 300 | 10 | 17 | 37 | 49 |
| 200 | 7 | 12 | 29 | 39 |
| 100 | 5 | 8 | 20 | 27 |
| 6 | 1 | 3 | 7 | 8 |
| 3 | 1 | 2 | 6 | 7 |
| pH | 7.5 | 7.6 | 7.5 | 7.6 |
| Low Shear Rate | 8,600 | 46,900 | 54,700 | 70,500 |

Formulations 4-7 were then hot rolled at 150° F. for 20 hours, and measurements were taken. The results are summarized in table 6 below.

TABLE 6

Measurements after hot rolling for 20 hours

| Shear Rate (RPM) | Initial 4 | Initial 5 | Initial 6 | Initial 7 |
|---|---|---|---|---|
| 600 | 19 | 37 | 63 | 100 |
| 300 | 12 | 24 | 44 | 72 |
| 200 | 9 | 19 | 35 | 59 |
| 100 | 6 | 13 | 25 | 43 |
| 6 | 1 | 4 | 9 | 16 |
| 3 | 1 | 3 | 8 | 14 |
| pH | 8.7 | 8.6 | 8.7 | 8.6 |
| Low Shear Rate | 2,300 | 10,700 | 24,600 | 40,100 |

After hot rolling and taking the above measurements, 10 lb/bbl of $CaCO_3$ was added to each of formulations 4 to 7. Measurements were again taken.

TABLE 7

Measurements of Formulations 4-7 with CaCO₃ added

| Shear Rate (RPM) | Initial 4 | Initial 5 | Initial 6 | Initial 7 |
|---|---|---|---|---|
| 600 | 17 | 36 | 66 | 111 |
| 300 | 11 | 25 | 46 | 81 |
| 200 | 9 | 20 | 38 | 67 |
| 100 | 6 | 14 | 28 | 50 |
| 6 | 2 | 6 | 11 | 20 |
| 3 | 2 | 5 | 10 | 18 |
| pH | 8.7 | 8.6 | 8.7 | 8.6 |
| Low Shear Rate | 8,700 | 19,300 | 46,600 | 67,000 |

Those of ordinary skill in the art will recognize that other formulations other than those described above may be used without departing from the scope of the present invention. In particular, many other additives may be used, without departing from the monovalent brine systems disclosed in the present application. Therefore, no limitation on the scope of the claimed subject matter is intended by reference to specific amounts of chemicals described above, so long as the fluid is a monovalent brine/modified starch formulation having the desired fluid properties.

The concentration of the starch as disclosed herein is selected to provide a well fluid having at least the following characteristics: (a) a low shear rate viscosity greater than about 5,000 centipoise; (b) a high shear rate viscosity at 600 $sec^{-1}$ in the range from about 15 to about 70 centipoise measured at 120° F.

The fluids of the claimed subject matter are useful in various petroleum recovery operations such as well drilling, including drilling into hydrocarbon-containing formations, completion, workover and the like as is known in the art. Specifically, the fluids of the claimed subject matter are useful in drilling a well wherein the drilling fluid is circulated within a borehole being drilled as drilling proceeds, and in well completion and workover methods wherein a subterranean formation is contacted with an aqueous fluid to form a bridge and seal on the formation, all as are well known in the art.

Surprisingly, therefore, the claimed subject matter has found that dense monovalent cations, such as sodium bromide for example, may be used in conjunction with the modified starches disclosed in U.S. Pat. No. 6,300,286. Therefore, embodiments of the claimed subject matter advantageously allow the use of well fluids having the above rheological properties, in areas, such as Alaska, where divalent cation containing systems are impermissible.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. A monovalent cation containing well fluid consisting essentially of: a brine system and an amount of a crosslinked starch derivative selected such that the well fluid has the following characteristics:
    (a) a low shear rate viscosity greater than about 5,000 centipoise;
    (b) a high shear rate viscosity at 511 $sec^{-1}$ in the range from about 15 to about 70 centipoise measured at 120° F., wherein the brine system consists essentially of at least 0.6 equivalents per liter of a water soluble monovalent cation salt that is substantially free of divalent cations, wherein the anion of the salt is a halide, and wherein the well fluid is substantially free of xanthan gum.

2. The well fluid of claim 1, wherein the starch derivative comprises a pre-gelatinized crosslinked amylopectin starch which has been crosslinked to about 25% to about 60% of the maximum attainable viscosity.

3. The well fluid claim 1, further comprising a particulate bridging agent which is substantially insoluble in the aqueous brine.

4. A method of treating a well that comprises:
    adding a well fluid consisting essentially of a brine system and an amount of a crosslinked starch derivative selected such that the well fluid has the following characteristics:
    (a) a low shear rate viscosity greater than about 5,000 centipoise;
    (b) a high shear rate viscosity at 511 $sec^{-1}$ in the range from about 15 to about 70 centipoise measured at 120° F. to the well; and
    causing the well fluid to travel through at least a portion of the well, wherein the brine system consists essentially of at least 0.6 equivalents per liter of a water soluble monovalent cation salt that is substantially free of divalent cations, wherein the anion of the salt is a halide, and wherein the well fluid is substantially free of xanthan gum.

5. A method of treating a well that comprises:
    adding a well fluid a consisting essentially of a brine system, a particulate bridging agent which is substantially insoluble in the aqueous brine, and an amount of a crosslinked starch derivative selected such that the well fluid has the following characteristics:
    (a) a low shear rate viscosity greater than about 5,000 centipoise;
    (b) a high shear rate viscosity at 511 $sec^{-1}$ in the range from about 15 to about 70 centipoise measured at 120° F. to the well; and
    causing the well fluid to travel through at least a portion of the well, wherein the brine system consists essentially of at least 0.6 equivalents per liter of a water soluble monovalent cation salt that is substantially free of divalent cations, wherein the anion of the salt is a halide, and wherein the well fluid is substantially free of xanthan gum.

6. A monovalent cation containing well fluid consisting essentially of: a brine system, and a viscosifying agent including a starch derivative, wherein the starch derivative is a pregelatinized cross linked amylopectin starch which has been crosslinked to about 25% to about 60% of the maximum attainable viscosity, wherein the brine system consists essentially of at least 0.6 equivalents per liter of a water soluble monovalent cation salt that is substantially free of divalent cations, wherein the anion of the salt is a halide, and wherein the well fluid is substantially free of xanthan gum.

7. The monovalent cation containing well fluid of claim 2, wherein the pre-gelatinized crosslinked amylopectin starch comprises less than 10 wt % amylase.

8. The monovalent cation containing well fluid of claim 6, wherein the pre-gelatinized crosslinked amylopectin starch comprises less than 10 wt % amylase.

9. A monovalent cation containing well fluid consisting essentially of: an aqueous monovalent brine system and an amount of a crosslinked starch derivative selected such that the well fluid has the following characteristics:
  (a) a low shear rate viscosity greater than about 5,000 centipoise;
  a high shear rate viscosity at 511 $sec^{-1}$ in the range from about 15 to about 70 centipoise measured at 120° F., wherein the aqueous monovalent brine system comprises at least 90% by weight of the well fluid, and wherein the aqueous monovalent brine system consists essentially of at least 0.6 equivalents per liter of a water soluble monovalent cation salt that is substantially free of divalent cations, wherein the anion of the salt is a halide, and wherein the well fluid is substantially free of xanthan gum.

10. The well fluid of claim 9, wherein the starch derivative comprises a pre-gelatinized crosslinked amylopectin starch which has been crosslinked to about 25% to about 60% of the maximum attainable viscosity.

11. The monovalent cation containing well fluid of claim 10, wherein the pre-gelatinized crosslinked amylopectin starch comprises less than 10 wt % amylase.

12. A monovalent cation containing well fluid consisting essentially of an aqueous monovalent brine system, a particulate bridging agent which is substantially insoluble in the aqueous brine,
and an amount of a crosslinked starch derivative selected such that the well fluid has the following characteristics:
  (a) a low shear rate viscosity greater than about 5,000 centipoise;
  (b) a high shear rate viscosity at 511 $sec^{-1}$ in the range from about 15 to about 70 centipoise measured at 120° F., where in the aqueous monovalent brine system comprises at least 90% by weight of the well fluid, and wherein the aqueous monovalent brine system consists essentially of at least 0.6 equivalents per liter of a water soluble monovalent cation salt that is substantially free of divalent cations, wherein the anion of the salt is a halide, and wherein the well fluid is substantially free of xanthan gum.

13. A method of treating a well that comprises:
adding a well fluid consisting essentially of an aqueous monovalent brine system and an amount of a crosslinked starch derivative selected such that the well fluid has the following characteristics:
  (a) a low shear rate viscosity greater than about 5,000 centipoise;
  (b) a high shear rate viscosity at 511 $sec^{-1}$ in the range from about 5 to about 70 centipoise measured at 120° F. to the well; and
causing the well fluid to travel through at least a portion of the well, wherein the aqueous monovalent brine system comprises at least 90% by weight of the well fluid, and wherein the aqueous monovalent brine system consists essentially of at least 0.6 equivalents per liter of a water soluble monovalent cation salt that is substantially free of divalent cations, wherein the anion of the salt is a halide, and wherein the well fluid is substantially free of xanthan gum.

14. A method of treating a well that comprises:
adding a well fluid consisting essentially of an aqueous monovalent brine system, a particulate bridging agent which is substantial insoluble in the aqueous brine, and an amount of a crosslinked starch derivative selected such that the well fluid his the following characteristics:
  (a) a low shear rate viscosity greater than about 5,000 centipoise;
  (b) a high shear rate viscosity at 511 $sec^{-1}$ in the range from about 15 to about 70 centipoise measured at 120° F. to the well; and
causing the well fluid to travel through at least a portion of the well, wherein the aqueous monovalent brine system comprises at least 90% by weight of the well fluid, and wherein the aqueous monovalent brine system consists essentially of at least 0.6 equivalents per liter of a water soluble monovalent cation salt that is substantially free of divalent cations, wherein the anion of the salt is a halide, and wherein the well fluid is substantially free of xanthan gum.

15. A monovalent cation containing well fluid consisting essentially of: an aqueous monovalent-brine system, and a viscosifying agent including a starch derivative, wherein the starch derivative is a pregelatinized crosslinked amylopectin starch which has been crosslinked to about 25% to about 60% of the maximum attainable viscosity, wherein the aqueous monovalent brine system comprises at least 90% by weight of the well fluid, and wherein the aqueous monovalent brine system consists essentially of at least 0.6 equivalents per liter of a water soluble monovalent cation salt that is substantially free of divalent cations, wherein the anion of the salt is a halide, wherein the well fluid has a low shear rate viscosity greater than about 5,000 centipoise and a high shear rate viscosity at 511 $sec^{-1}$ in the range from about 15 to about 70 centipoise measure at 120° F., and wherein the well fluid is substantially free of xanthan gum.

16. The monovalent cation containing well fluid of claim 15, wherein the pre-gelatinized crosslinked amylopectin starch comprises less than 10 wt % amylase.

17. A well fluid consisting essentially of:
a brine system, wherein the brine system consisting essentially of water and a water soluble monovalent cation salt that is substantially free of divalent cations, wherein the monovalent cation salt is at least 0.6 equivalents per liter, and wherein the anion of the salt is a halide; and
an amount of a crosslinked starch derivative selected such that the well fluid has the following characteristics:
  (a) a low shear rate viscosity greater than about 5,000 centipoise;
  (b) a high shear rate viscosity at 511 $sec^{-1}$ in the range from about 15 to about 70 centipoise measured at 120° F.,
and wherein the well fluid is substantially free of xanthan gum.

* * * * *